May 15, 1956  L. H. HOPKINS  2,745,238
COUNTERBALANCED DRIVE MEANS FOR HARVESTERS
Filed Sept. 28, 1954
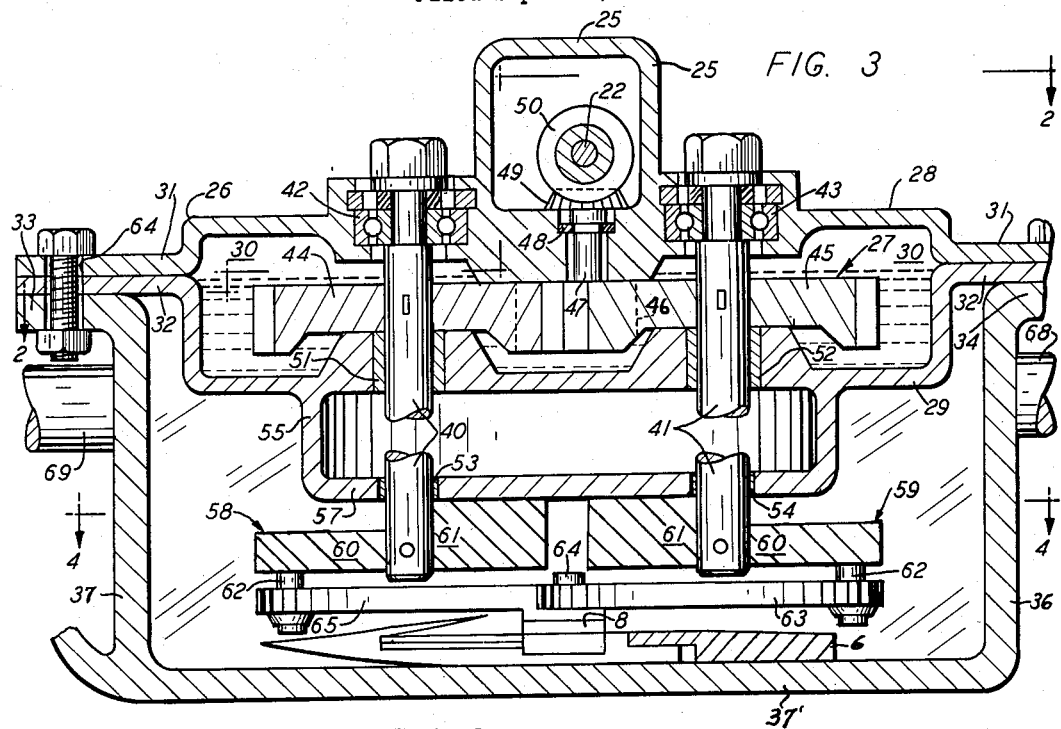
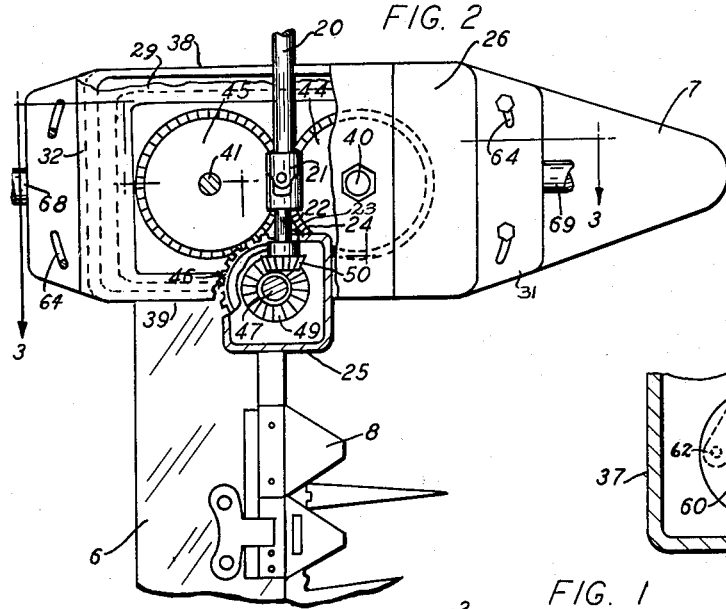
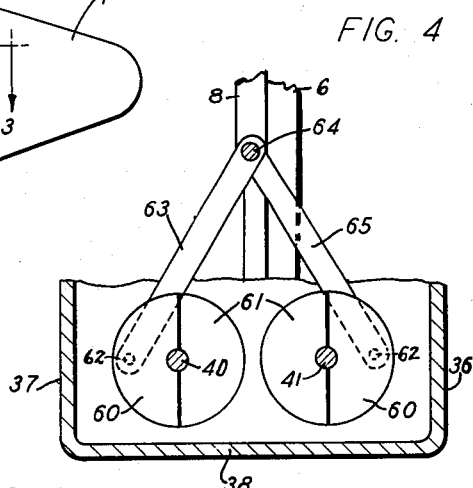
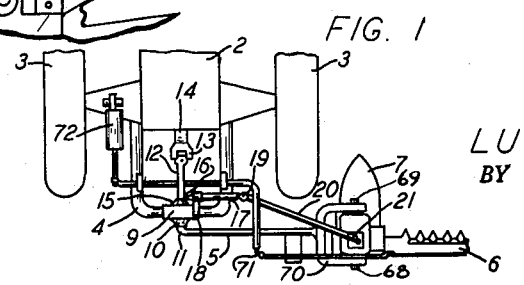
INVENTOR.
LUTHER H. HOPKINS
BY Paul O. Pippel
ATTORNEY

United States Patent Office 2,745,238
Patented May 15, 1956

2,745,238

COUNTERBALANCED DRIVE MEANS FOR HARVESTERS

Luther H. Hopkins, Oak Park, Ill., assignor to International Harvester Company, a corporation of New Jersey Application September 28, 1954, Serial No. 458,802

8 Claims. (Cl. 56—296)

This invention relates to sickle-drive mechanism for harvesters, and more specifically, to an improved drive mechanism in which the inertia forces developed by reciprocation of the sickle balance against inertia forces created in opposition to those of the sickle by means of properly related counter-rotating counterweights.

Harvesters which incorporate cutter bars are either of the type which are known as combines, or grain harvesters, or mowers. The grain harvesters normally employ a deck, or a platform, on the leading end of which is provided the reciprocating sickle which is firmly secured to the large mass which effectively absorbs the vibration. However, mowers are intended to be extremely light-weight machines, and as such, are of extremely skeletal construction and do not possess the necessary mass distribution for effectively absorbing the shocks generated by the rapidly reciprocating sickle.

Offhand, it would appear to be a simple matter to merely make use of well-known counterbalancing principles in order to obviate the difficulties experienced through excessive vibration in mowers. However, farm equipment presents a peculiar problem, in that it must be extremely rugged and durable and the balancing mechanism must be so arranged that it will be adaptable for incorporation in conventional mower designs, and the mechanism must be simple so that it may be readily adjusted by the farmer and yet possess a high degree of efficiency and operate in several positions of the mower bar.

The principal object of the invention is to balance the inertia forces of the reciprocating sickle in a harvester by means of counter-rotating counterweights, so phased as to effectively counterbalance the inertia forces of the reciprocating sickle at each end of its stroke.

A more specific object of the invention is to mount these counter-rotating counterweights on separate axes of rotation, disposed in a plane substantially normal to the line of reciprocation of the sickle.

A still further object of the invention is to utilize existing sickle-drive principles, insofar as possible, and incorporate the proved drive mechanism without material change in the conventional design of the harvester, to which the invention is applied.

A still further object of the invention is to mount the drive mechanism in such a manner that it may be positioned with the separate axes of rotation of the counterweights, slightly out of normal with respect to the line of reciprocation of the sickle, so as to generate a slight vibration in the mower of controlled amplitude so as to discharge hay which tends to pile upon the mower after it is cut.

These and other objects of the invention will become more apparent from the specification and the drawings, wherein:

Figure 1 is a fragmentary plan view of a representative tractor-mower construction embodying the improved drive unit;

Figure 2 is an enlarged horizontal sectional view of the drive taken substantially on the line 2—2 of Figure 3;

Figure 3 is a further enlarged sectional view of the drive taken substantially in the planes indicated by the line 3—3 of Figure 2; and Figure 4 is a diagrammatic reduced sectional view taken substantially on the line 4—4 of Figure 3.

As previously indicated, the principles of the invention are applicable to harvesters in general. However, the preferred embodiment herein discussed was primarily intended for use in a mower; therefore, for purposes of clarity and brevity in the description, reference will be made to harvester structure as typified by a mower.

The structure chosen for the purposes of illustration and description comprises a mower of the tractor-mounted type, wherein, as shown in Figure 1, a tractor having a longitudinal body 2 carried between rear traction wheels 3 has a rearwardly extending U-shaped drawbar 4 which provides supporting structure for the mounting of a mower comprising a support in a form of a drag bar 5 on which is mounted cutting mechanism including a cutter bar 6, an inner shoe 7, and a reciprocating sickle 8.

The center portion of the drawbar 4 has secured thereto a bearing block 9, the lower portion of which is provided with a bearing 10 which provides means for pivotally supporting the forward bent end 11 of the drag or coupling bar 5 for swinging about a longitudinal axis. The upper portion of the bearing block 9 journals a forwardly extending input shaft 12 connected by a universal joint 13 to the drive shaft 14 which constitutes the power take-off of the tractor.

The shaft 12 is provided with a bevel gear 15 constrained for rotation therewith and meshing with a bevel gear 16 which is connected to a shaft 17 which is journalled on an arm 18 mounted on the bearing block 9, and the shaft 17 is connected through a universal joint 19 to a telescoping shaft assembly 20 which is connected through a universal joint 21 to a shaft 22 which is journalled in a bearing 23 in an upright wall 24 of a gear case 25 which is upstanding from, and formed integral with, a gear housing 26 for the drive mechanism, generally designated 27 (Figure 3).

The gear case 26 comprises top and bottom dished pan-like complements 28 and 29 which define a cavity 30 therebetween for enclosing the gears, as hereinafter described, and the portions 28 and 29 are provided as opposite ends with outturned flanges 31 and 32, respectively, which are disposed in abutting superposed relationship and overlie the outturned flanges 33 and 34 of the inner shoe housing, or carrier, 7, the flanges 33 and 34 being formed integral with the upper ends of rear and front upstanding walls 36 and 37, between which the bottom portion 29 is fitted loosely to extend loosely between the lateral upstanding walls 38 and 39 of the inner shoe, as best seen in Figure 2. The carrier 7 includes a bottom wall 37' welded to the bar 6. The top portion 28 supports a pair of vertical shafts 40 and 41 of the drive mechanism 27 by means of bearing assemblies 42 and 43, the shafts 40 and 41 being keyed for rotation with meshing gears 44 and 45. The gear 45 meshes with a spur gear 46 (Figures 2 and 3), which is connected to the lower end of an input shaft 47 which is mounted on a vertical axis in a bearing 48 carried in the top portion 28 of the housing. The jack shaft 47 projects into the gear case 25, and at its upper end is provided with a bevel gear 49 which meshes with the bevel gear 50 on the shaft 22.

The gears 44 and 45 are adapted to bathe with the gear 46 in oil provided in the cavity 30 of the housing wherein the gears are located.

The shafts 40 and 41 extend downwardly through bearings 51 and 52 in the lower portion 29 of the gear housing, and project at their lower ends through bearings 53 and 54 in a depending support extension 55 on the lower portion 29 of the housing and below the bottom wall 57 of the support 55 the shafts are keyed respectively to crank assemblies 58 and 59, each of which comprises a circular plate structure 60 which is provided at one side of its axis of rotation with a counterweight 61 and at the opposite side with a crank pin, or wrist pin, 62.

Each crank pin depends below its plate structure 60, and the pin 62 of the crank 59 is connected to the inner end of a connecting rod 63 which at its other, or outer, end is pivoted, as at 64, on a substantially vertical axis to the inner end of the knife 8, at which point 64 the outer end of the connecting rod, or pitman 65 is also connected, the inner end of the pitman 65 being journalled to the pin 62 of the assembly 58.

It will be understood that the drive initiates from the power-take-off shaft 14, through the knuckle 13, to the bevel gear 15, and then to the bevel gear 16, and through the shaft 17, knuckle 19, shaft assembly 20, knuckle 21, to the shaft 22 which, in turn, drives the bevel gear 50 which drives the bevel gear 49, and thus the vertical input shaft 47 which, in turn, drives the spur gear 46, and thus the gear 45 which, in turn, drives the gear 44. This effects counter-rotation of the shafts 40 and 41 which, in turn, counter-rotates the cranks 58 and 59 and reciprocate the pitmans 63 and 65 for reciprocating the mower bar, or cutter, 8. It will be understood that the shafts 40 and 41 are normally disposed in a plane substantially at right angles to the line of reciprocation of the mower bar 8, as shown in Figure 2. However, if it is found that the mower clogs because of the total absence of vibration, I have provided an adjustment in the flanges 31 and 32 of the casing 26 in the nature of arcuate slots 64 having a center substantially coincident with the longitudinal vertical plane of the mower, whereby the entire driving mechanism may be rotated to a position disposing the axes of rotation, that is, the shafts 40 and 41, out of normal with respect to the line of reciprocation of the mower.

It will be observed that the front and rear walls 37 and 36 of the inner shoe 7 are provided with trunnions 68 and 69, by which the housing, or carrier, 7 is pivotally connected on a fore and aft axis to a yoke 70 forming part of the supporting structure that includes the drag bar 5, whereby the mower 6 may be pivotal vertically to raised and lowered position by means of the operating linkage 71 which is operated by the hydraulic system 72 and is of conventional design, as will be readily understood by those skilled in the art; and since it does not form part of the present invention, will not be further described.

I claim:

1. For a harvester having a support and a cutter bar including an elongated sickle reciprocable thereon on a given line and a shoe connected to the cutter bar: sickle drive mechanism, comprising a carrier structure having means for the fixed mounting thereof on said shoe and having external means for pivotal mounting thereof on said support; driving means including a pair of laterally spaced counter-rotating shafts journalled on the carrier structure on axes disposed in a plane substantially at right angles to said line of reciprocation of the sickle, each of said shafts having a crank, a counterweight connected to each shaft diametrically opposite to the crank, and a driving connection operatively interconnecting each crank with said sickle and including a separate connecting rod extending between each crank and the sickle and pivotally connected thereto, said counterweights being phased to develop a counter-balancing inertia to the inertia of the sickle at each end of its stroke attendant to rotation of said shafts.

2. The invention according to claim 1, and further characterized in that said carrier structure comprises a base portion and a supported portion and said driving means carried directly from the supported portion and said shafts journalled thereon, and said inner shoe rigidly connected to the supporting portion, and said supported portion movable in a plane parallel to said line of reciprocation relative to said supporting portion to position said shafts in preselected angular relationship to said line of reciprocation of the sickle.

3. For a harvester having supporting structure including cutting mechanism provided with a reciprocating sickle operable in a given plane and on a given cutter bar: sickle-drive mechanism, comprising a carrier having means for the mounting thereof on the supporting structure; said carrier connected to one end of said cutting mechanism, a pair of counter-rotating crank members mounted on said carrier and having axes of rotation disposed in a plane substantially normal to said plane of operation of said sickle and spaced substantially equal distances and at opposite sides of said center line of reciprocation of said sickle; means individually operatively interconnecting said sickle with each of said crank means; and counterweight means connected to said crank members and oriented in planes generally parallel to said plane of operation of said sickle and proportioned and phased to obtain a force factor substantially counter-balancing inertia forces of said sickle at each end of its stroke.

4. For a harvester, described in the normal operating position, having a support and a cutter bar including a sickle reciprocable thereon on a given generally horizontal cutter line: sickle-drive mechanism, comprising a carrier forming part of said support and including a pair of spaced upstanding walls and an interconnecting bottom wall adapted for fixed mounting to said cutter bar, a gear case supported in a generally horizontal plane from said upstanding walls, a pair of vertical first shafts rotatably journalled from said gear case and having lower ends depending therefrom, a crank connected to the lower end of each shaft, a connecting rod associated with each crank and having one end connected thereto, means drivingly interconnecting said rods at their other ends to each other and to said sickle, a pair of meshing gears in said gear case connected to respective shafts, a vertical input jack shaft journalled on said gear case and having a gear meshing with one of said gears for driving the same, and a counterweight connected to said lower ends of each of said first shafts diametrically opposite to the related crank, said first shafts disposed in a vertical plane oriented substantially normal to said line of reciprocation of the sickle.

5. The invention according to claim 4, and said shafts disposed at opposite sides of the longitudinal vertical plane of said sickle, said plane being coincident with said center line.

6. The invention according to claim 4, and further characterized in that said carrier and said gear case are adjustably interconnected and said driving means are entirely carried by said gear case, whereby said case is positionable with said first shafts in planes out of normal to the said line of reciprocation of the mower for developing controlled vibration.

7. In a device of the class described, a carrier, a cutter bar connected to the carrier, a sickle reciprocal on a given line on the cutter bar, driving means for said sickle including a pair of drive transmitting shafts each including a crank, a pitman connected to the sickle and to each crank, and each shaft further having a counterweight diametrically opposite the crank, support means rotatably supporting said shafts from the carrier, and means adjustably securing said last-mentioned means to the carrier and said support means movable on the carrier attendant to adjustment of said adjustable means with said shafts to position said shafts in planes at various angles to said line of reciprocation of the sickle.

8. For a harvester having a support and a cutter bar including a sickle reciprocable thereon in a given plane and on a given line: sickle-drive means, comprising a carrier having means for the fixed mounting thereof on the cutter bar, said carrier including a lower supporting portion and an upper supported portion mounted upon said lower portion, a pair of vertical shafts journalled from said upper portion and having lower ends projecting into said lower portion, a crank on the lower portion of each shaft, pitman means connected to each crank, means connecting the pitman means to the sickle, a counter-weight on each shaft diametrically opposite the crank thereon and positioned proximate the plane of reciprocation of the sickle, and means releasably securing said supported portion to said supporting portion and said supported portion movable about a center in a plane extending longitudinally of the sickle and perpendicular to said plane to positions disposing said shafts in various planes angularly related to said line of reciprocation of the sickle, and means for counter-rotating said shafts in phased relation with said counterweights in counterbalancing relation to the inertia of the sickle.

References Cited in the file of this patent
UNITED STATES PATENTS

| | | |
|---|---|---|
| 1,668,984 | Simpson | May 8, 1928 |
| 2,428,924 | Albertson | Oct. 14, 1947 |
| 2,619,839 | Love | Dec. 2, 1952 |
| 2,704,941 | Holford | Mar. 29, 1955 |